Dec. 17, 1929.        H. R. RICARDO        1,740,037
PACKING RING FOR THE VALVES OR OTHER RECIPROCATING
PARTS OF FLUID PRESSURE ENGINES
Filed April 11, 1927
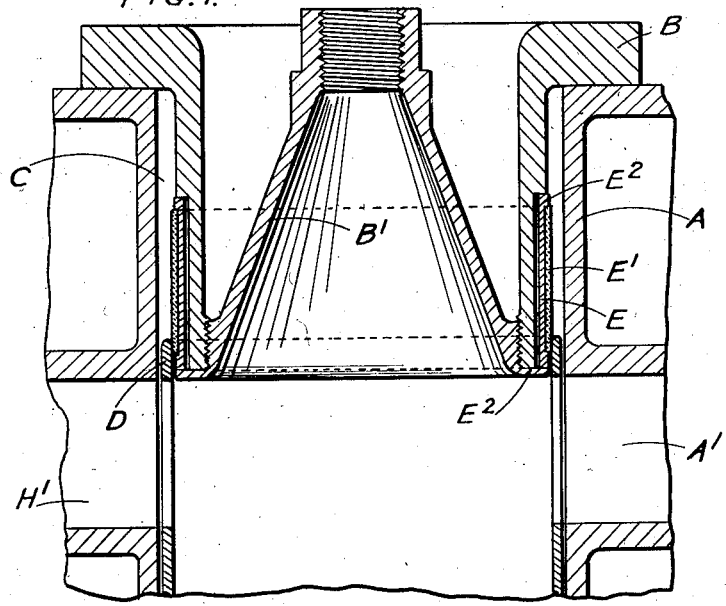
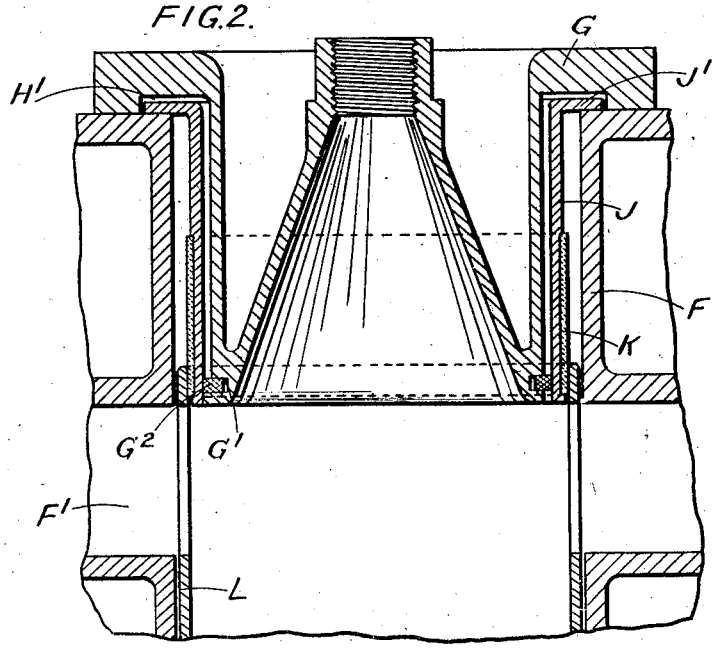
INVENTOR
Harry R. Ricardo,
BY
Watson, Coit, Morse & Grindle
ATTYS.

Patented Dec. 17, 1929

1,740,037

UNITED STATES PATENT OFFICE

HARRY RALPH RICARDO, OF LONDON, ENGLAND

PACKING RING FOR THE VALVES OR OTHER RECIPROCATING PARTS OF FLUID-PRESSURE ENGINES

Application filed April 11, 1927, Serial No. 182,885, and in Great Britain May 28, 1926.

This invention relates to packing rings for the valves or other reciprocating parts of fluid pressure engines and has for its object to provide a construction of junk or like ring which may be used in different types of engine for the purpose of ensuring a gas-tight joint between a reciprocating member such as a valve and the part within which this member reciprocates.

The invention is capable of various applications but it is intended more particularly for use in internal combustion engines of the sleeve valve type and more especially those engines of this type wherein the sleeve valve is given a reciprocating and rotary motion the inner end of this valve lying and moving between the wall of the cylinder and a plug-like extension on the cylinder head. Such a construction of sleeve valve internal combustion engine may comprise a plug-like cylinder head provided with a junk ring which lies within and forms a joint with the inner end portion of the sleeve valve. Difficulty has been experienced in providing a satisfactory form of junk ring which will maintain a gas-tight joint within the sleeve valve but a ring constructed in accordance with the present invention has been found to overcome this difficulty.

According to this invention a junk or like ring for use in a fluid pressure engine has applied thereto a layer or facing of a relatively plastic metal such as white or other metal of like type as used in ordinary bearings this layer constituting the rubbing surface of the ring. The ring which is formed of hard metal and preferably unbroken, that is to say, not split, has its rubbing surface, which may be the inner or outer surface of the ring, faced with a layer, which is preferably relatively thin, of plastic or fusible metal of the type indicated. A convenient method that may be adopted for providing the ring with this plastic metal is to tin the surface of the ring and then cast on to the ring the required thin layer of white or other like metal. The bearing or rubbing surface thus faced with the plastic metal is then turned but not highly finished and the ring is forced into place within or over the member between which and the ring movement is to take place. The moving part is then run in and it will be found that the surface of the ring attains a high polish and provides and will maintain the desired gas-tight joint.

The whole of the width of the bearing or rubbing face of the ring may be coated with the plastic metal or this coating may be arranged to extend over only a part of the width of the ring. For example, the coating may extend over the greater part of the width of the surface but not quite up to the edges of the ring. In the latter case the face of the hard metal ring is conveniently slightly recessed leaving at the edges of the ring circumferential ribs or flange-like parts of suitable dimensions. The layer of plastic metal is then applied to and fills the recessed part but does not extend over the ribs or flanges of hard metal at the edges of the ring. The ring when finished has a diameter over the faced part which is very slightly in excess of the diameter of the narrow bands or flange-like parts of hard metal at the edges of the ring. These hard metal bands or flanges may be provided at both edges of the ring or in some cases only at one edge. Such a construction with narrow unfaced bands at the edges of the hard metal ring is suitable for use in certain engine structures as for example internal combustion engines of the sleeve valve type where the junk ring lies within and forms a gas-tight joint with the inner end of the sleeve valve. The unfaced edge of the ring then protects the facing of relatively fusible metal from the high local heat flow at the edge of the ring and obviates any risk of melting of the fusible metal which might otherwise occur, for example, at the one edge of the junk ring near which the exhaust gases pass at high velocity.

The plastic metal employed for the purpose of facing the ring may vary in composition in accordance with the temperature to which it is to be subjected. In some cases ordinary white metal such as used in bearings may be employed but in other cases where the temperature of the gases in the fluid pressure engine is higher, it is desirable to use a composition containing a larger proportion of lead.

In applying the invention to an internal combustion engine of the sleeve valve type where the sleeve valve is of normal iron or steel, the junk ring may be of mild steel coated with white metal or with bronze, preferably lead bronze. If the sleeve is formed of a high expansion metal the junk ring is preferably made of a metal having a similar coefficient of expansion, for example this may be bronze or preferably a high expansion austenitic steel such as that containing 18% chromium and 8% nickel. The facing with which the ring is provided is in this case preferably formed of white metal in the case of water-cooled engines but for air-cooled engines the facing would be of bronze and preferably lead bronze disposed on a ring formed of high expansion steel.

When applying the invention to an internal combustion engine of the sleeve valve type indicated above, a junk ring unsplit and faced on its exterior with plastic metal in the manner described is forced into the end of the sleeve valve and the head of the cylinder is then inserted and the junk ring secured in place. The engine is then run for a short time thereby giving the surface of the junk ring a considerable polish and afterwards the engine is ready for use.

After the junk ring has been run in, it is desirable to take it out and remove from the edges the small fringe of the relatively plastic metal which may have been extruded beyond the outer edges of the ring. In some cases, however, as for instance where the edges of the ring are not faced with the plastic metal, there may be no necessity to take this step, or again the small fragments of extruded plastic metal may be left to wear off in time and be ejected from the cylinder with the exhaust gases.

The invention may be carried into practice in various ways and applied to packing rings of various kinds, but two alternative constructions of packing ring as applied to the joint between the cylinder head and the sleeve valve in a sleeve valve internal combustion engine are illustrated by way of example in the accompanying drawings, in which Figure 1 is a longitudinal section through a construction of cylinder head employing one type of packing ring according to this invention, and Figure 2 is a similar view to Figure 1 of a cylinder head construction employing an alternative form of packing ring according to this invention.

In the construction illustrated in Figure 1, a cylinder A has at its upper end a plug-like cylinder head B provided with a centre part $B^1$ formed substantially conical as shown and constituting the combustion chamber. The external diameter of the portion of the cylinder head which lies within the cylinder is of less diameter than the internal diameter of the cylinder so as to leave an annular space C between these two parts in which is adapted to move the upper end of a sleeve valve D which controls inlet and exhaust ports $A^1$ in the wall of the cylinder A. The joint between the sleeve valve D and the cylinder head B is sealed by a junk ring constructed according to this invention. This ring is undivided and comprises a part E of relatively hard metal, for example mild steel, bronze or a high expansion austenitic steel, which serves as a backing for a facing $E^1$ of a relatively plastic metal such as white metal, lead bronze or the like which is let into an annular recess in the part E and is of slightly greater diameter than the end portions $E^2$ of this part. The outer surface of the sleeve D bears against the inner wall of the cylinder A.

In the alternative construction illustrated in Figure 2, a cylinder F is provided with a plug-like cylinder head G extending into the upper end of the cylinder, the outside diameter of the plug being less than the internal diameter of the cylinder so as to leave an annular space H between these two parts as shown. Freely mounted in the annular space H is a ring J the upper end of which carries a flange $J^1$ engaging the upper face of the cylinder casting F and disposed in an annular recess $H^1$ in the cylinder head casting so as to be free to move therein within limits.

The ring J is formed, for example, of bronze, mild steel or of a high expansion austenitic steel or other relatively hard metal and has formed in it towards its lower end an annular recess which is provided with a filling K of relatively plastic metal such as white metal, lead bronze or the like. This plastic metal projects beyond the outer circumferential surface of the ring J and constitutes a rubbing surface for the upper end of a sleeve valve L which is disposed and moves within the annular space between the cylinder wall and the ring J and controls ports $F^1$ in the cylinder. The outer surface of the sleeve valve bears against the cylinder wall.

Arranged in an annular groove $G^1$ in the lower end of the plug-like cylinder head G is a packing ring $G^2$ which serves to maintain the joint between the cylinder head G and the ring J gas-tight.

In either of the arrangements described above the method of fitting the junk ring is as follows. The junk ring whether carried by the cylinder head itself as shown in Figure 1, or constituted by a separate member disposed between the cylinder head and the cylinder wall as shown in Figure 2, is forced into the end of the sleeve valve and the cylinder head is then secured in place. The engine is then run for a short time thereby moving the sleeve valve over the surface of the plastic metal carried by the junk ring and giving this surface a considerable polish. The engine is then ready for use.

After the junk ring has been run in, it is sometimes desirable however to take it out and remove from its edges the small fringe of relatively plastic metal which may have been extruded beyond the outer edges of the ring. In some cases however, for example where the plastic metal is arranged in a groove in the hard metal ring as shown in Figure 1, such a fringe of metal may not be extruded, or if extruded it may be found unnecessary to remove it before the engine is used, but it may be left to be removed by use and to be expelled from the cylinder with the exhaust gases.

It is to be understood that although the invention has been described with particular reference to undivided packing rings, nevertheless in some cases it may be desirable to provide split rings with a rubbing surface or facing of relatively plastic metal in accordance with this invention.

Moreover, although as described above the invention is particularly applicable to junk rings for use in internal combustion engines of the sleeve valve type, it is to be understood that the invention may be applied to junk or other packing rings for use in other types of internal combustion engine or for use in steam engines or, for example, in piston valves where a gas-tight joint is required between a reciprocating member and a fixed part.

What I claim as my invention and desire to secure by Letters Patent is:—

1. In a fluid pressure engine, the combination with a cylinder, of a cylinder head of cylindrical shape extending into one end of said cylinder, a reciprocating sleeve disposed between said cylinder and cylinder head and a junk ring of relatively hard metal mounted on said cylinder head, said ring being provided with a facing of bearing metal having a forced fit within said sleeve, and adapted to bed down to a working clearance on running the engine.

2. In a fluid pressure engine, the combination with a cylinder, of a cylinder head of cylindrical shape extending into one end of said cylinder, a reciprocating sleeve disposed between said cylinder and cylinder head and a one piece, continuous junk ring of relatively hard metal mounted on said cylinder head, said ring being provided with a facing of bearing metal engaging said sleeve, said facing projecting from the surface of said ring.

3. In a fluid pressure engine, the combination with a cylinder, of a cylinder head projecting into one end of said cylinder, a reciprocating sleeve and a continuous annular member disposed between said cylinder and cylinder head, said annular member being provided with a bearing facing for engaging said sleeve, and a packing ring interposed between said annular member and cylinder head.

4. In a fluid pressure engine, the combination with a cylinder, of a cylinder head projecting into one end of said cylinder, a reciprocating sleeve and an annular member disposed between said cylinder and cylinder head provided with an annular lip for engaging the top surface of the cylinder, said annular member being provided with a bearing facing for engaging said sleeve, and a packing ring interposed between said annular member and cylinder head.

In testimony whereof I have signed my name to this specification.

HARRY RALPH RICARDO.